United States Patent
Fuchshuber et al.

(10) Patent No.: US 8,676,235 B2
(45) Date of Patent: Mar. 18, 2014

(54) METHOD AND DEVICE FOR FORWARDING SHORT MESSAGES IN GSM/UMTS MOBILE RADIO NETWORKS

(75) Inventors: Michael David Fuchshuber, Vienna (AT); Rudolf Michael Liebhart, Vienna (AT); Daniel Schandl, Aegyd (AT)

(73) Assignee: T-Mobile International AG, Bonn (DE)

( * ) Notice: Subject to any disclaimer, the term of this patent is extended or adjusted under 35 U.S.C. 154(b) by 1202 days.

(21) Appl. No.: 12/309,165

(22) PCT Filed: Jun. 26, 2007

(86) PCT No.: PCT/EP2007/005630
§ 371 (c)(1),
(2), (4) Date: Oct. 2, 2009

(87) PCT Pub. No.: WO2008/006462
PCT Pub. Date: Jan. 17, 2008

(65) Prior Publication Data
US 2010/0048177 A1 Feb. 25, 2010

(30) Foreign Application Priority Data
Jul. 10, 2006 (DE) .......................... 10 2006 032 032

(51) Int. Cl.
*H04W 4/00* (2009.01)
*H04M 3/42* (2006.01)

(52) U.S. Cl.
USPC ............................................ 455/466; 455/417

(58) Field of Classification Search
USPC .............................. 455/466, 417, 412.1, 414.2
See application file for complete search history.

(56) References Cited

U.S. PATENT DOCUMENTS

2006/0136560 A1* 6/2006 Jiang .............................. 709/206

FOREIGN PATENT DOCUMENTS

| CN | 1662076 | 8/2005 | |
|---|---|---|---|
| DE | 20280091 | 10/2002 | |
| DE | 10303161 | 1/2004 | |
| EP | 1432255 | 6/2004 | |
| WO | 0122751 | 3/2001 | |
| WO | WO 01/22751 A1 * | 3/2001 | ............... H04Q 7/22 |
| WO | 2006056791 | 6/2006 | |

\* cited by examiner

*Primary Examiner* — Brandon Miller
(74) *Attorney, Agent, or Firm* — Cooper & Dunham LLP

(57) ABSTRACT

The invention relates to a method and a device for forwarding short messages from a transmitter (24) to a target number of a receiver (26) in GSM/UMTS mobile radio networks, wherein the target number of the receiver (26) is replaced by a forwarding call number before establishing routing information required for delivery of the short message in a service node (10) and delivery of the short message to the forwarding call number is carried out.

10 Claims, 2 Drawing Sheets

METHOD AND DEVICE FOR FORWARDING SHORT MESSAGES IN GSM/UMTS MOBILE RADIO NETWORKS

The invention relates to a method and a device for forwarding short messages in GSM/UMTS mobile radio networks.

Call forwarding for voice calls is counted as a standard functionality of GSM (Global System for Mobile Communications) and UMTS (Universal Mobile Telecommunication System) networks. However, forwarding short messages (SMS) has hitherto not been possible in practice, but is desirable in many cases.

Currently existing approaches for diverting short messages are described, for example, in the documents DE 103 24 636 A1, DE 101 17 051 A1 or US 2002/0090936 A1. The methods disclosed therein require changes of various network elements or interfaces as a result of which the provision of this functionality requires considerable expenditure in resources with respect to costs, implementation time, personnel expenditure etc.

The object of the invention consists in specifying a method and a device for forwarding short messages in GSM/UMTS mobile radio networks which are characterized by their simple implementation.

According to the invention, this object is achieved by the features of the independent claims, the wording of which is referred to at this point.

Preferred embodiments and other advantageous features of the invention are specified in the dependent claims, the wording of which is referred to at this point.

The solution according to the invention is characterized by the use of interfaces standardized by ITU-T. In other words, a method is presented which allows the known and proven voice functionality call forwarding to be used also for the short message service (SMS). According to the invention, only standardized interfaces and messages (protocols) will be used for implementing the method, as a result of which a seamless and cost-effective integration into an existing GSM/UMTS network is possible.

According to the invention, the forwarding functionality is implemented in a separate service node which consists essentially of three modular function blocks: interaction function, translation function and accounting function. These function blocks guarantee simple incorporation of the service node into an existing network architecture and the provision of the required functions for the intervention in the SMS message flow and for the setting-up of the service (provisioning) and the charging.

Compared with the approaches to a solution already in existence, the method according to the invention is characterized by the following features and advantages:

There is no necessity for adapting standardized interfaces, particularly Message Application Part—MAP, and components of the mobile radio network, particularly the mobile switching centers (MSC) or the home location register (HLR), as a result of which a rapid and cost-effective implementation and commissioning can take place.

Provisioning of the SMS profile data necessary for SMS forwarding occurs in the service node and separately from the voice profile data which are usually kept available in the home location register HLR. There is thus no supplementation or alteration of the existing voice profile data in the HLR required.

The SMS forwarding is charged separately from the existing SMS charging and, as a result, offers more flexibility with respect to tariffing and implementation of the service.

The forwarding corresponds to a CFU (call forwarding unconditional) known from conventional call forwarding, i.e. to an unconditional diverting without consideration of the subscriber status, e.g. logged out, not available, and is thus simple to use.

Short messages are preferably forwarded to a defined single directory number. This does not take into consideration SMS distribution or a so-called "hunting" and thus contributes to a lesser complexity of the solution.

Naturally, the method according to the invention can also be used for forwarding so-called EMS (enhanced message service) and MMS (multimedia messaging service) messages.

An exemplary embodiment of the invention will now be explained in greater detail with reference to the drawings.

The core of the invention consists in the setting-up of a separate service node 10 for the service of SMS forwarding. The service node 10 as the central element is incorporated in the mobile radio network, for example as server computer, and includes the following functionalities:

Interaction Function

The interaction function 12 is responsible for the communication of the service node with external units for provisioning and event management, e.g. the communication with the home location register HLR 20 and the mobile switching centers MSC 22. This requires the support of the SS7 protocol MAP in Version 2.

Translation Function

The translation function 14 is responsible for determining and changing the forwarding number in dependence on the selected destination number and optionally on the directory number of the calling subscriber. For each subscriber who wishes to use the service of SMS forwarding, his subscriber number and a forwarding number set up by the subscriber, to which the SMS is to be forwarded, are stored in a database dependent on the subscriber. The database can be installed internally in the service node 10 or incorporated externally.

Accounting Function

The accounting function 16 is responsible for the accounting in the case of the provisioning and the short message forwarding, e.g. generating tickets, on-line accounting via Camel Application Part (CAPvS) in the case of pre-paid.

Figure 1:
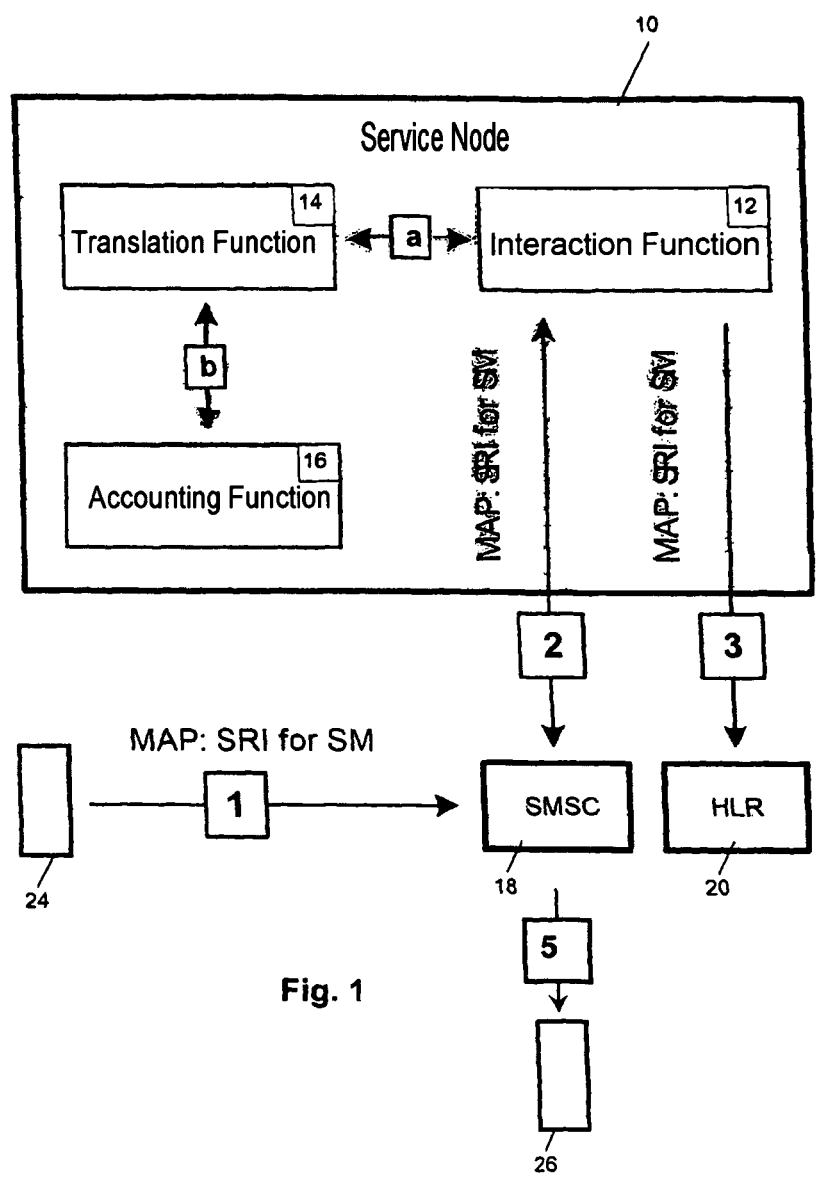
FIG. 1 shows the sequence of SMS forwarding according to the invention.

FIG. 1 explains the method for forwarding SMS messages by means of number conversion in a mobile radio network. On a terminal 24 suitable for this purpose, for example a mobile telephone, a short message SMS is generated. This short message is to be conveyed to a terminal 26 of a receiver. The SMS is first conveyed via the mobile radio network to an SMS center 18, also called a short message service center (SMSC) and temporarily stored there, message 1. The SMSC 18 asks the HLR 20 for the location (routing information) of the receiver by means of a MAP command "SRI for SM" (send routing info for short message) which is transmitted as standard from the SMS center SMSC 18 to the home location register HLR 20. According to the invention, an intervention in the standard SMS delivery processing between the SMSC 18 and the HLR 20 now occurs. The SMSC 18 conveys the SRI for SM message not directly to the HLR 20 but to the interaction function 12 of the service node 10, message 2. The translation function checks whether a forwarding number is possibly set up for the destination number. If this is so, the destination number is modified into the forwarding number by the translation function and the routing request is forwarded with altered destination number to the responsible HLR 20, message 3. The HLR 20 determines the routing information belonging to the forwarding number and returns this information to the service node 10 which forwards it to the SMSC 18. Using this routing information, the SMSC 18 can now convey the short message to the forwarding number or the associated terminal 26, respectively, message 5. Changes required for implementing this function exclusively relate to the routing logics in the network elements of the mobile radio network involved.

Figure 2:
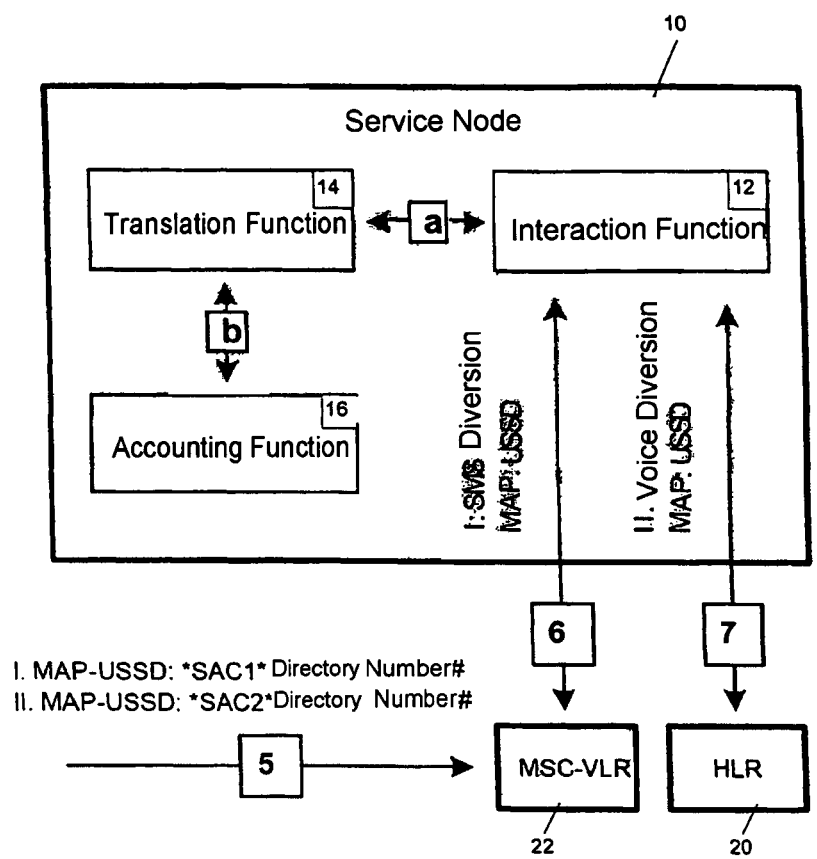
FIG. 2 shows the provisioning of SMS forwarding by the user.

As illustrated in FIG. 2, the service for forwarding short messages is administered by means of USSD (unstructured supplementary services data). Using network-specific USSD codes, comfort and service functions can be interrogated or controlled in the mobile radio network. Each network operator can define the codes for his network freely. After the corresponding USSD code has been input at the mobile telephone and the connection key has been pressed, a status or text message with the desired information appears on the display. According to the invention, USSD is used for controlling the functions of the service node 10. Naturally, further possibilities of administration are additionally possible e.g. via an Internet portal.

Two scenarios for provisioning the forwarding number are explained here. A distinction is given by means of the USSD identifier (SAC1 or SAC2):

1. Only the SMS forwarding number is provisioned or altered in the service node 10:
   After the validation by the interaction function (according to A party, network affiliation, . . . ), the forwarding number is stored in the translation function 14, messages 5 and 6.
2. The SMS forwarding number and the voice forwarding number are provisioned or altered:
   After the SMS forwarding number has been provisioned in the service node 10 as under item 1, the USSD identifier (SAC1 and SAC2) is changed to the standard GSM value (to \*\*21\*directory number#) and then forwarded by the interaction function 12 to the HLR 20 in order to ensure simultaneous provisioning of the voice diversion number by this means, messages 5, 6 and 7.

LIST OF REFERENCE DESIGNATIONS

1 Message transmission
2 Message transmission
3 Message transmission
5 Message transmission
6 Message transmission
7 Message transmission
10 Service node
12 Interaction function
14 Translation function
16 Accounting function
18 Short message service center SMSC
20 Home location register HLR
22 Mobile switching center MSC, Visitor location register VLR
24 Terminal (transmitter)
26 Terminal (receiver)

The invention claimed is:

1. A method for forwarding short messages from a transmitter to a destination number of a receiver in Global System for Mobile Communications/Universal Mobile Telecommunication System (GSM/UMTS) mobile radio networks, wherein the destination number of the receiver is replaced by a forwarding number before the routing information needed for delivering the short message is determined, after which the routing information is determined and the short message is delivered by means of the forwarding number, characterized in the steps of:
   generating a short message (SMS) in a terminal of the transmitter which is intended for a terminal of the receiver;
   conveying the short message via the mobile radio network to a short message service center (SMSC) and temporarily storing the message;
   requesting a home location register (HLR) for routing information of the receiver by a mobile application part (MAP) command, and sending routing information for the short message, which is transmitted as standard from the short message service center (SMSC) to the home location register (HLR);
   interjecting the short message (SMS) delivery process between the short message service center (SMSC) and the home location register (HLR) by conveying the short message to an interaction function of a service node that is incorporated in the signaling path between the short message service center (SMSC) and the home location register (HLR);
   checking by a translation function of the service node whether a forwarding number is set up for the destination number;
   if this is so, directly modifying the destination number into the forwarding number by the translation function of the service node;
   forwarding the routing request with the forwarding number to the home location register (HLR);
   determining in the home location register (HLR) the routing information belonging to the forwarding number and returning this information to the service node which forwards it to the short message service center (SMCSC); and
   using this routing information, by the short message service center (SMSC) for conveying the short message to the forwarding number of the associated terminal of the receiver.

2. The method as claimed in claim 1, characterized in that the forwarding number is stored together with the destination number of the receiver in a database.

3. The method as claimed in claim 1, characterized in that, on the basis of the destination number, an inquiry of the forwarding number from the database is initiated by the MAP inquiry "send routing info for short message".

4. The method as claimed in claim 1, characterized in that the service of forwarding the short message can be provisioned by the subscriber by means of USSD messages.

5. The method as claimed in claim 1, characterized in that the service of forwarding the short message is charged separately from an existing short message service charging.

6. A non-transitory computer readable storage medium comprising a computer program, which can be executed on a data processing device, for carrying out the method as claimed in claim 1.

7. A device for forwarding short messages from a transmitter to a destination number of a receiver in Global System for Mobile Communications/Universal Mobile Telecommunication System (GSM/UMTS) mobile radio networks
wherein the destination number of the receiver is replaced by a forwarding number before the routing information needed for delivering the short message is determined, after which the routing information is determined and the short message is delivered by the forwarding number, wherein the device is characterized by:
a short message service center (SMSC) for temporarily storing a short message which is conveyed from a terminal of the transmitter and which is intended for a terminal of the receiver;
a home location register (HLR) for routing information of the receiver by a mobile application part (MAP) command and sending routing information for the short message, which is transmitted as standard from the short message service center (SMSC) to the home location register (HLR);
a service node that is incorporated in the signaling path between the short message service center (SMSC) and the home location register (HLR) for interjecting the short message (SMS) delivery process between the short message service center (SMSC) and the home location register (HLR) wherein the service node comprises an interaction function, a translation function, and an accounting function;
wherein the short message is conveyed to the interaction function of the service node and the translation function of the service node checks whether a forwarding number is set up for the destination number, and if this is so, the translation function of the service node directly modifies the destination number into the forwarding number and forwards the routing request with the forwarding number to the home location register (HLR), and the home location register determines the routing information belonging to the forwarding number and returns this information to the service node which forwards it to the short message service center (SMSC) and the short message service center (SMSC) uses this routing information to convey the short message to the forwarding number of the associated terminal of the receiver.

8. The device as claimed in claim 7, wherein the interaction function is used for the communication of the service node (10) with external units and for provisioning and event management.

9. The device as claimed in claim 7, wherein the translation function is associated with a database for determining the forwarding number based on the selected destination number.

10. The device as claimed in claim 7, characterized by an accounting function (16) for accounting for the service of forwarding the short message.

* * * * *